US011737439B2

(12) United States Patent
Niitsuma

(10) Patent No.: US 11,737,439 B2
(45) Date of Patent: Aug. 29, 2023

(54) SPINNING REEL

(71) Applicant: Shimano Inc., Osaka (JP)

(72) Inventor: Akira Niitsuma, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 17/873,644

(22) Filed: Jul. 26, 2022

(65) Prior Publication Data

US 2023/0101660 A1    Mar. 30, 2023

(30) Foreign Application Priority Data

Sep. 28, 2021 (JP) .................................. 2021-158235

(51) Int. Cl.
*A01K 89/01* (2006.01)
(52) U.S. Cl.
CPC .............................. *A01K 89/01142* (2015.05)
(58) Field of Classification Search
CPC .......... A01K 89/0114; A01K 89/01141; A01K 89/01142
See application file for complete search history.

(56) References Cited

U.S. PATENT DOCUMENTS

2019/0104713 A1* 4/2019 Saito .................. A01K 89/0114

FOREIGN PATENT DOCUMENTS

| JP | 11-86 A | 1/1999 |
| JP | 2019-106898 A | 7/2019 |

\* cited by examiner

*Primary Examiner* — Emmanuel M Marcelo
(74) *Attorney, Agent, or Firm* — Global IP Counselors, LLP

(57) ABSTRACT

A spinning reel includes a spool shaft movable in a front-rear direction with respect to a reel body, a spool connected to the spool shaft and configured to have a fishing line wound therearound, a pinion gear supported by the reel body so as to be rotatable, a reciprocating mechanism configured to move the spool shaft in reciprocating fashion in the front-rear direction, and an intermediate gear disposed between the pinion gear and the reciprocating mechanism, the intermediate gear reducing rotation of the pinion gear, and transmitting rotation to the reciprocating mechanism. A value obtained by dividing a stroke distance of the spool shaft by a winding pitch of the fishing line and a module (M) of the intermediate gear is greater than or equal to 60, the module (M) being a diameter of a pitch circle relative to a number of teeth of the intermediate gear.

5 Claims, 7 Drawing Sheets

| | STROKE (S) | FRONT FLANGE OUTER DIAMETER (R) | MODULE OF INTERMEDIATE GEAR | WINDING PITCH (P) | S/P | R^S/P | S/P/M | SIZE CATEGORY | COMPREHENSIVE RATING OF CASTING AND REELING |
|---|---|---|---|---|---|---|---|---|---|
| ADOPTED MODEL 1 | 17.0 | 47 | 0.3 | 0.5897 | 28.8 | 1355 | 96.1 | A | A1 |
| ADOPTED MODEL 2 | 13.5 | 43 | 0.3 | 0.5854 | 23.1 | 992 | 7.9 | B | B1 |
| COMPARATIVE MODEL 3 | 17.0 | 52 | 0.3 | 0.9000 | 18.9 | 982 | 63.0 | C | C1 |
| CONVENTIONAL MODEL 1 | 14.5 | 45 | 0.5 | 1.14 | 12.7 | 572 | 25.4 | A | A2 |
| CONVENTIONAL MODEL 2 | 13.5 | 40 | 0.6 | 2 | 6.6 | 270 | 11.25 | B | B2 |
| CONVENTIONAL MODEL 3 | 19 | 52 | | 2.8 | 6.8 | 353 | | C | C2 |

| | STROKE (S) | FRONT FLANGE OUTER DIAMETER (R) | MODULE OF INTERMEDIATE GEAR | WINDING PITCH (P) | S/P | R*S/P | S/P/M | SIZE CATEGORY | COMPREHENSIVE RATING OF CASTING AND REELING |
|---|---|---|---|---|---|---|---|---|---|
| ADOPTED MODEL 1 | 17.0 | 47 | 0.3 | 0.5897 | 28.8 | 1355 | 96.1 | A | A1 |
| ADOPTED MODEL 2 | 13.5 | 43 | 0.3 | 0.5854 | 23.1 | 992 | 7.9 | B | B1 |
| COMPARATIVE MODEL 3 | 17.0 | 52 | 0.3 | 0.9000 | 18.9 | 982 | 63.0 | C | C1 |
| CONVENTIONAL MODEL 1 | 14.5 | 45 | 0.5 | 1.14 | 12.7 | 572 | 25.4 | A | A2 |
| CONVENTIONAL MODEL 2 | 13.5 | 40 | 0.6 | 2 | 6.8 | 270 | 11.25 | B | B2 |
| CONVENTIONAL MODEL 3 | 19 | 52 | | 2.8 | 6.8 | 353 | | C | C2 |

FIG. 7

SPINNING REEL

CROSS-REFERENCE TO RELATED APPLICATIONS

This application claims priority to Japanese Patent Application No. 2021-158235, filed on Sep. 28, 2021. The entire disclosures of Japanese Patent Application No. 2021-158235 are hereby incorporated by reference.

BACKGROUND

Field of the Invention

The present disclosure relates to a spinning reel.

Background Art

It is known that various problems occur at the dead points of conventional spinning reels when the spool moves back and forth in reciprocating fashion, that is, at the frontmost and rearmost positions of the spool. For example, when the fishing line is released or cast, noise is generated and the release resistance of the fishing line increases at the dead points due to contact between the fishing lines. This causes decreased flight distance. To solve these problems at the dead points, a conventional device has been proposed with an increased the spool diameter and a spool with an extended reciprocating stroke (for example, refer to Japanese Laid-Open Patent Application No. 2019-106898) and a device has been proposed with technology to make the winding pitch of the fishing line finer (for example, refer to Japanese Laid-Open Patent Application No. Hei 11[1999]-000086).

SUMMARY

It has been determined that in the conventional devices, if the spool diameter is increased, the diameter of the rotor for winding the fishing line around the spool is larger. Therefore, in order to provide a space to enable the rotor to rotate, the distance from the fishing rod attachment foot to the housing must be increased. That is, the larger diameter of the spool causes an increased size of the spinning reel.

Moreover, if the stroke of the reciprocating movement of the spool is extended, the length of a reciprocating mechanism in the front-rear direction must be increased. It is therefore necessary to increase the size of the housing to accommodate the reciprocating mechanism. That is, due to the increased stroke of the reciprocating movement of the spool, the spinning reel, must be larger.

On the other hand, compared to the above-mentioned technology, it has been found that making the winding pitch of the fishing line finer effectively reduces the size of the spinning reel. However, it has been determined that making the winding pitch finer also creates a more complicated structure of the spinning reel, such as a reduction mechanism with a high reduction ratio, and difficult-to-manufacture components, such as a worm shaft with a thin wall thickness between grooves. As can be understood, more complicated spinning reel structures can be associated with high manufacturing costs.

For example, a possible configuration of the above-mentioned reduction mechanism with a high reduction ratio can be a simple gear train with small module gears. However, the use of small module gears necessitates taking the strength of the gears into consideration in the design of the gears. Thus, in order to design suitable gears in accordance with the size of the spool and the thickness of the fishing line, many prototypes must be made and complex strength calculations must be performed.

Thus, it has been determined that the prior art for solving the problem at the dead points are associated with the various problems described above.

Therefore, the present disclosure proposes a basic structure that is useful in the design of a reciprocating mechanisms and spools. That is, in the present disclosure, reference values to be used in the design of the reciprocating mechanism and the spool are set, and these reference values are used to design the reciprocating mechanism and the spool.

An object of the present disclosure is to propose a spinning reel having a basic structure that can suitably solve the problems of conventional spinning reels.

A spinning reel according to one aspect of the present invention comprises a spool shaft, a spool, a pinion gear, a reciprocating mechanism, and an intermediate gear. The spool shaft is supported so as to be movable in the front-rear direction with respect to the reel body. The spool is connected to the spool shaft. The fishing line can be wound around the spool. The pinion gear is supported by the reel body so as to be rotatable. The reciprocating mechanism moves the spool shaft back and forth in reciprocating fashion.

The intermediate gear is disposed between the pinion gear and the reciprocating mechanism. The intermediate gear reduces the rotation of the pinion gear and transmits it to the reciprocating mechanism. The first value obtained by dividing the stroke distance of the spool shaft by the winding pitch of the fishing line and the module (M) of the intermediate gear is greater than or equal to 60.

The spinning reel is configured such that the first value obtained by dividing the stroke distance of the spool shaft by the winding pitch of the fishing line and the module (M) of the intermediate gear is greater than or equal to 60. The problems of the conventional spinning reels can be suitably solved by designing a reciprocating mechanism and a spool using this configuration.

In the spinning reel according to another aspect of the present invention, the first value obtained by dividing the stroke distance of the spool shaft by the winding pitch of the fishing line and the module (M) of the intermediate gear is preferably less than or equal to 150.

In the spinning reel according to another aspect of the present invention, the winding pitch is preferably less than or equal to 1.0 mm.

In the spinning reel according to another aspect of the present invention, the spool preferably has a bobbin trunk, around the outer circumference of which a fishing line can be wound, and a front flange that extends radially outward from the front end of the bobbin trunk. In this case, the outer diameter of the front flange is less than 60 mm.

In the spinning reel according to another aspect of the present invention, it is preferred that the intermediate gear have a first intermediate gear and a second intermediate gear. The smaller of the first intermediate gear module (M) and the second intermediate gear module (M) is selected as the intermediate gear module (M).

The first intermediate gear is rotatable about a first axis parallel to the spool axis. The first intermediate gear has a first large-diameter gear that meshes with the pinion gear and a first small-diameter gear which has a smaller diameter than the first large-diameter gear and which rotates integrally with the first large-diameter gear.

The second intermediate gear is rotatable about a second axis parallel to the first axis. The second intermediate gear has a second large-diameter gear that meshes with the first small-diameter gear and a second small-diameter gear which has a smaller diameter than the second large-diameter gear and which rotates integrally with the second large-diameter gear. The reciprocating mechanism has a driven gear that meshes with the second small-diameter gear and a worm shaft that rotates integrally with the driven gear.

By this configuration, since the fishing line can be wound about the spool as the speed of the back-and-forth movement of the spool shaft is reduced, the problems of the conventional spinning reels can be suitably solved with a relatively simple structure.

The spinning reel of the present disclosure can suitably solve the problems of the conventional spinning reels.

BRIEF DESCRIPTION OF THE DRAWINGS

FIG. 7 is a table showing each of the numerical values of the basic structure as well as comprehensive ratings of casting and reeling for conventional spinning reels and the spinning reel of the present invention.

DETAILED DESCRIPTION OF EMBODIMENTS

Figure 1:
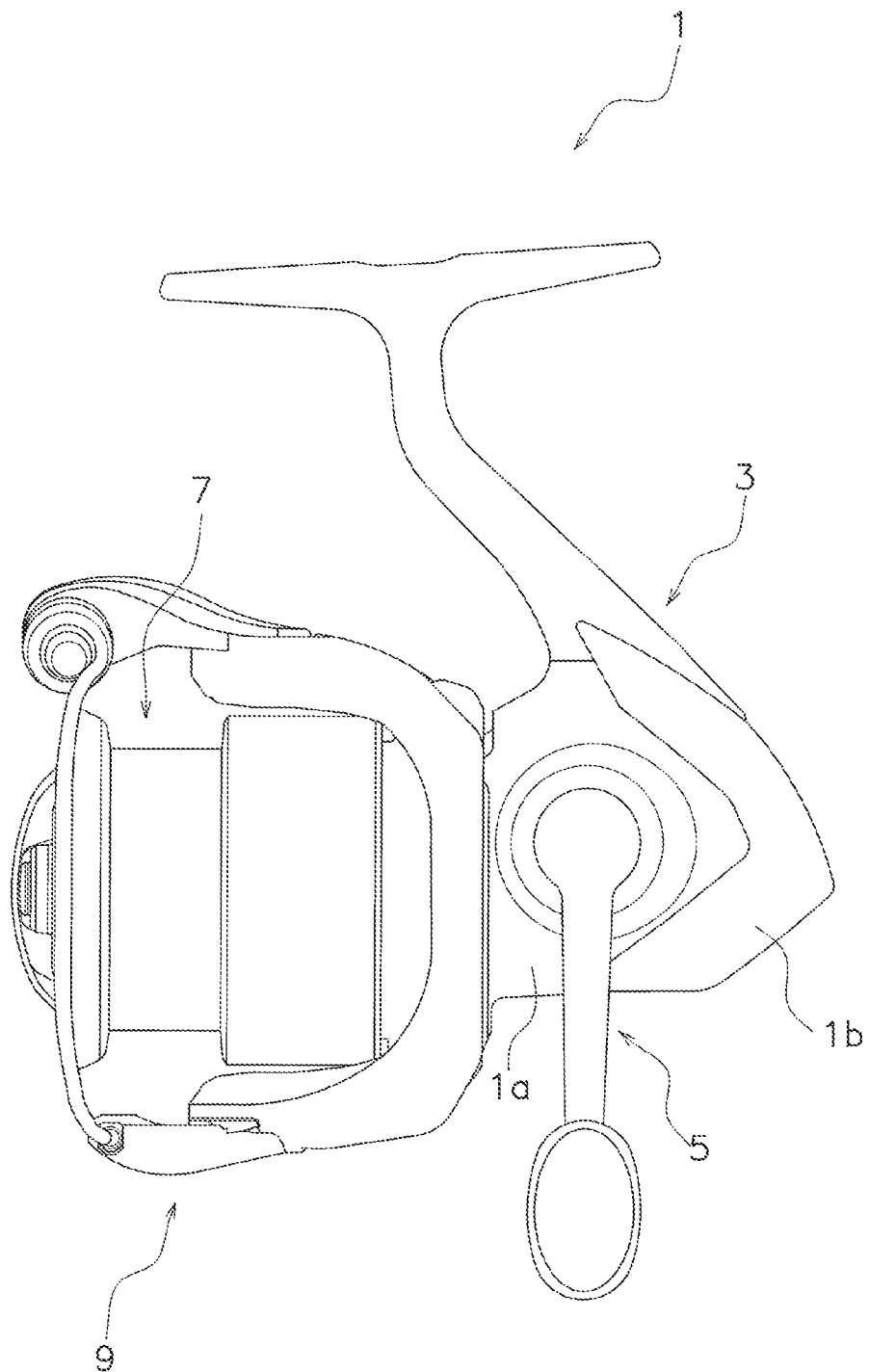
FIG. 1 is a side view of the spinning reel according to an embodiment of the present invention.
Figure 2:
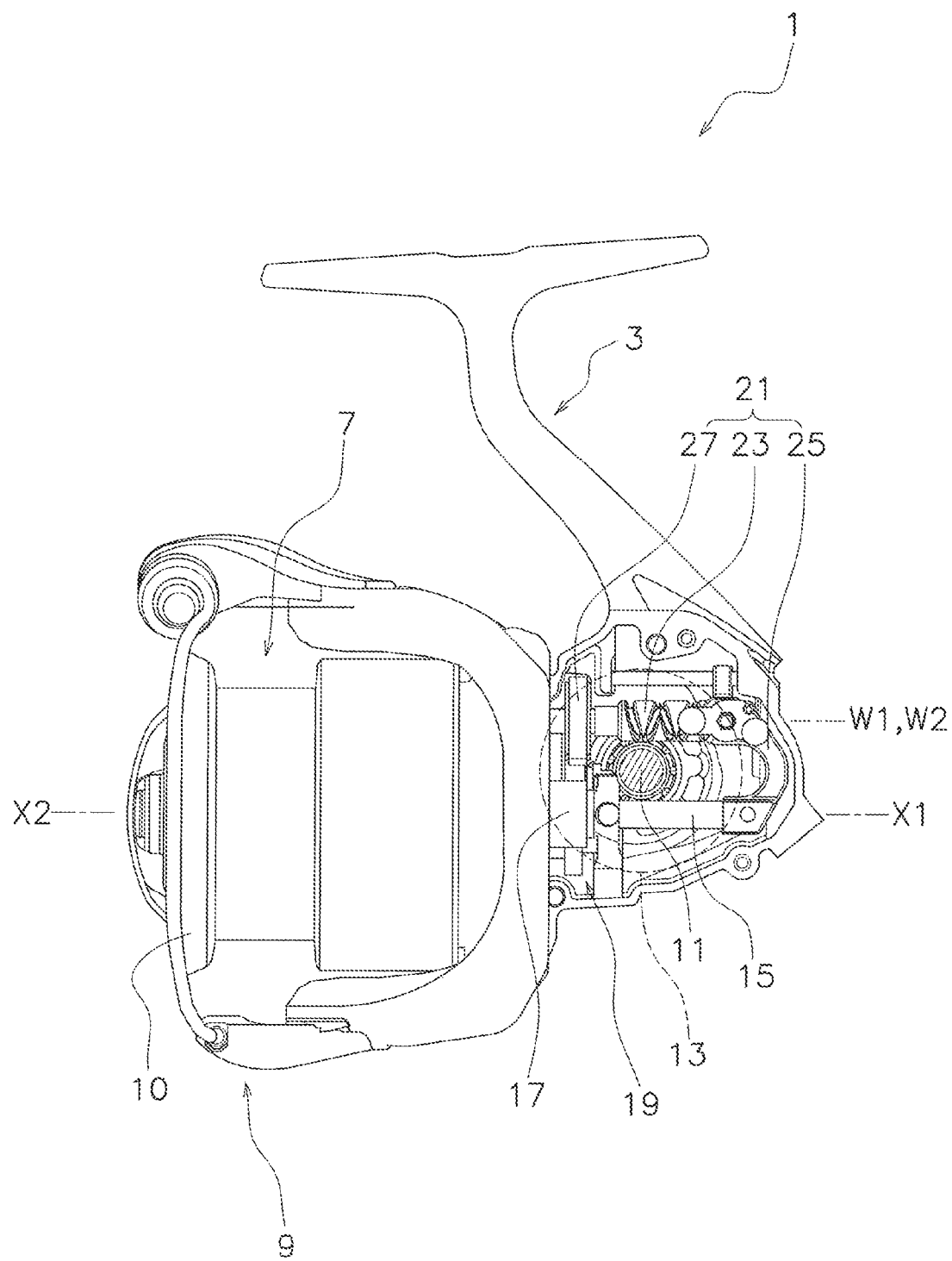
FIG. 2 is a side view of the spinning reel from which the side cover and the body guard have been removed.

As shown in FIG. 1, a spinning reel 1, to which one embodiment of the present invention is applied, comprises a reel body 3, a handle 5, a spool 7, and a rotor 9. As shown in FIG. 2, the spinning reel 1 further comprises a handle shaft 11, a drive gear 13, a spool shaft 15, a pinion gear 17, a reduction mechanism 19, and an oscillating mechanism 21 (one example of a reciprocating mechanism). FIG. 2 is a diagram in which a side cover 1a and a body guard 1b of the spinning reel 1 shown in FIG. 1 have been removed.

As shown in FIG. 1, the handle 5 is supported by the reel body 3 so as to be rotatable. In the present embodiment, an example of an embodiment in which the handle 5 is disposed on the left side of the reel body 3 is shown. The handle 5 can also be disposed on the right side of the reel body 3. The handle 5 is mounted on the handle shaft 11.

As shown in FIG. 2, the handle shaft 11 is supported by the reel body 3 so as to be rotatable. The drive gear 13 is mounted on the handle shaft 11 so as to rotate integrally with the handle shaft 11. The drive gear 13 meshes with the pinion gear 17.

A fishing line can wound about the spool 7. As shown in FIG. 2, the spool 7 is configured to be movable in the front-rear direction with respect to the reel body 3 together with the spool shaft 15. The spool 7 is connected to the spool shaft 15. For example, the spool 7 is connected to the distal end portion of the spool shaft 15 via a drag mechanism, not shown.

The spool 7 has a central axis X2. When the spool 7 is connected to the spool shaft 15, the central axis X2 of the spool 7 is coaxial with a spool axis X1, described further below.

Figure 3:
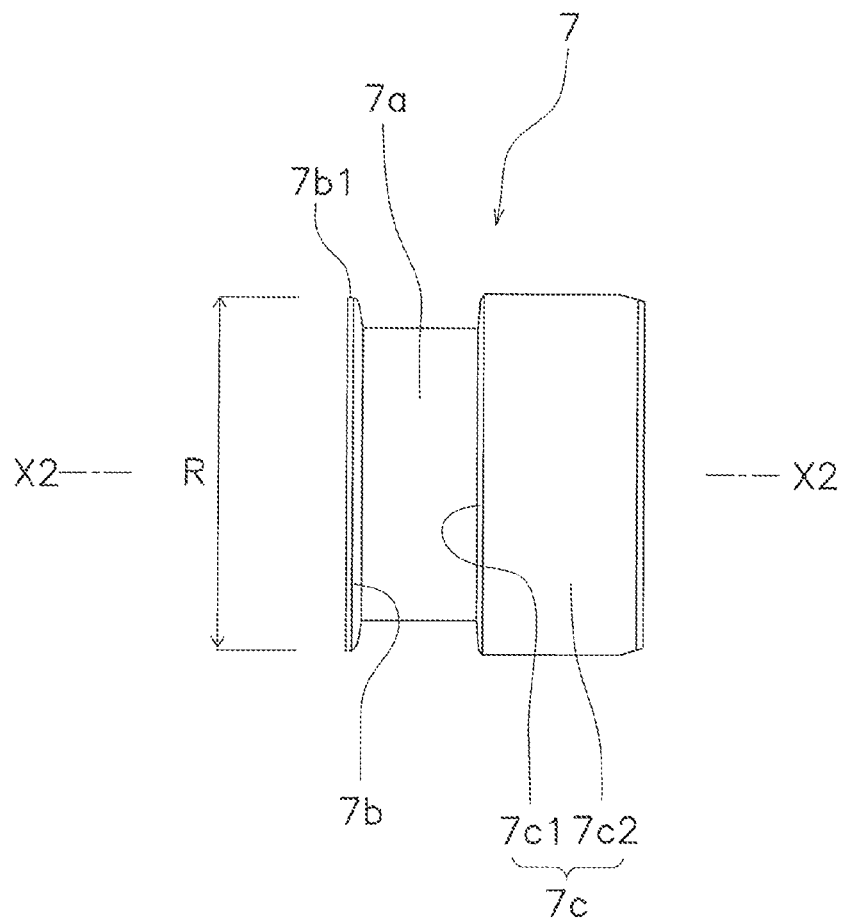
FIG. 3 is a side view of the spool.

As shown in FIG. 3, the spool 7 has a bobbin trunk 7a, a front flange 7b, and a skirt portion 7c. A fishing line can be wound about the outer periphery of the bobbin trunk 7a. The bobbin trunk 7a is formed in a cylindrical shape. The front flange 7b extends radially outward from the front end of the bobbin trunk 7a. The front flange 7b is disk-shaped with an outer diameter R and is integrally formed with the bobbin trunk 7a. The outer diameter R of the front flange 7b is defined by the outer circumferential surface 7b1 of the front flange 7b. A spool collar 10 is disposed on the radially outward side of the front flange 7b (refer to FIG. 2). The spool collar 10 covers the outer circumferential surface 7b1 of the front flange 7b.

The skirt portion 7c is integrally formed at the rear end of the bobbin trunk 7a. The skirt portion 7c includes a rear flange 7c1 and a cylindrical portion 7c2. The rear flange 7c1 extends radially outward from the rear end of the bobbin trunk 7a. The rear flange 7c1 is disk-shaped and is integrally formed with the bobbin trunk 7a. The cylindrical portion 7c2 extends rearward from the outer circumferential portion of the rear flange 7c1. The cylindrical portion 7c2 is formed in a cylindrical shape and is integrally formed with the rear flange 7c1.

As shown in FIG. 2, the spool shaft 15 is supported so as to be movable in the front-rear direction with respect to the reel body 3. The spool shaft 15 is inserted through the inner circumferential portion of the cylindrical pinion gear 17. The spool shaft 15 can be moved back and forth in reciprocating fashion with respect to the reel body 3 via the operation of the oscillating mechanism 21.

The spool shaft 15 has a spool axis X1. The front-rear direction and the axial direction are directions of extension of the spool axis X1. The radial direction is the direction away from spool axis X1, and the circumferential direction is the direction around spool axis X1.

The oscillating mechanism 21 moves the spool shaft 15 in the front-rear direction. The oscillating mechanism 21, for example, moves the spool shaft 15 in the front-rear direction in conjunction with the rotation of the handle shaft 11. The oscillating mechanism 21 is disposed in an internal space of the reel body 3.

Figure 4:
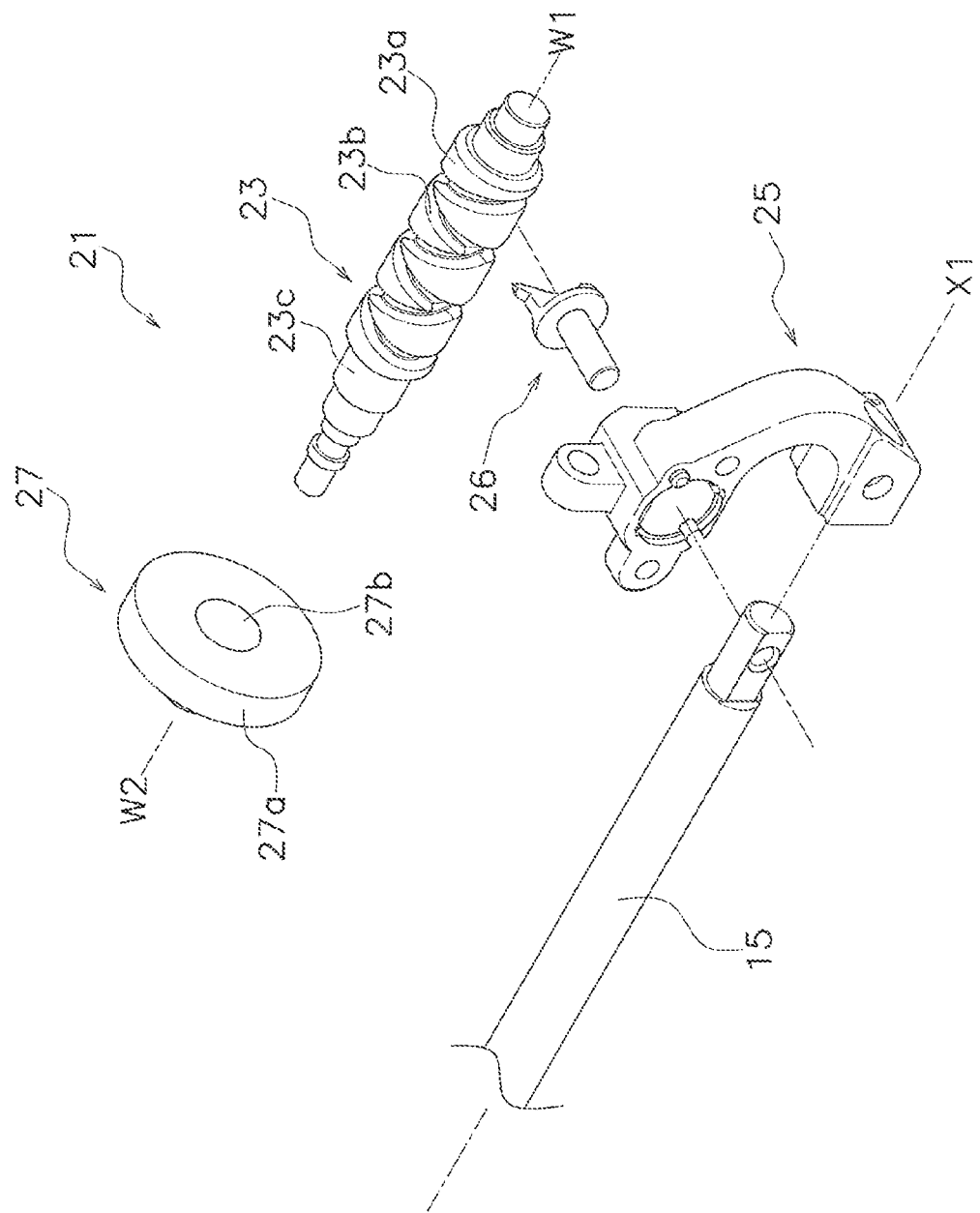
FIG. 4 is an exploded perspective view for explaining the oscillating mechanism.

As shown in FIGS. 2 and 4, the oscillating mechanism 21 includes a worm shaft 23, a slider 25, and a worm shaft gear 27 (one example of a driven gear). The worm shaft 23 rotates in order to move the spool shaft 15 and the slider 25 in the front-rear direction. The worm shaft 23 is disposed parallel to the spool shaft 15. The worm shaft 23 is supported by the reel body 3 so as to be rotatable, and worm shaft 23 has an axis of rotation W1.

The worm shaft 23 has a shaft body 23a and a groove portion 23b. The shaft body 23a is a shaft member that is longer in one direction. The shaft body 23a extends in the axial direction in which the axis of rotation W1 extends. The groove portion 23b is disposed on the outer circumferential surface of the shaft body 23a. A pawl member 26, described further below, engages the groove portion 23b.

The slider 25 is mounted on the spool shaft 15. For example, the slider 25 is fixed to the rear end of the spool shaft 15. The slider 25 moves in the front-rear direction via the rotation of the worm shaft 23.

For example, as shown in FIG. 4, the pawl member 26 is mounted on the slider 25. The pawl member 26 is mounted on the spool shaft 15 and the slider 25 so as to be rotatable. The pawl member 26 engages the groove portion 23b of the worm shaft 23. As a result, when the worm shaft 23 rotates, the pawl member 26 moves along the groove portion 23b of the worm shaft 23. The slider 25 thus moves in the front-rear direction.

As shown in FIGS. 2 and 4, the worm shaft gear 27 is disposed on the worm shaft 23, and has an axis of rotation W2. The worm shaft gear 27 is disposed on the worm shaft 23 such that the axis of rotation W2 of the worm shaft gear 27 is concentric with the axis of rotation W1 of the worm shaft 23. The worm shaft gear 27 rotates integrally with the worm shaft 23.

As shown in FIG. 4, the worm shaft gear 27 has a gear body 27a and an insertion hole 27b. The gear body 27a is disk-shaped. The gear body 27a meshes with a second small-diameter gear 33b (described further below) of the reduction mechanism 19.

The insertion hole 27b is disposed on the gear body 27a. For example, the insertion hole 27b passes through the gear body 27a in the axial direction in which the axis of rotation W2 of the worm shaft gear 27 extends. The worm shaft 23 is inserted through the insertion hole 27b. In this state, the worm shaft 23 integrally rotates with the worm shaft gear 27.

As shown in FIG. 2, the pinion gear 17 is formed with a cylindrical shape, and is supported by the reel body 3 so as to be rotatable. The pinion gear 17 is disposed on the radially outward side of the spool shaft 15. The pinion gear 17 rotates with respect to the spool shaft 15 and about the spool axis X1.

Figure 5:
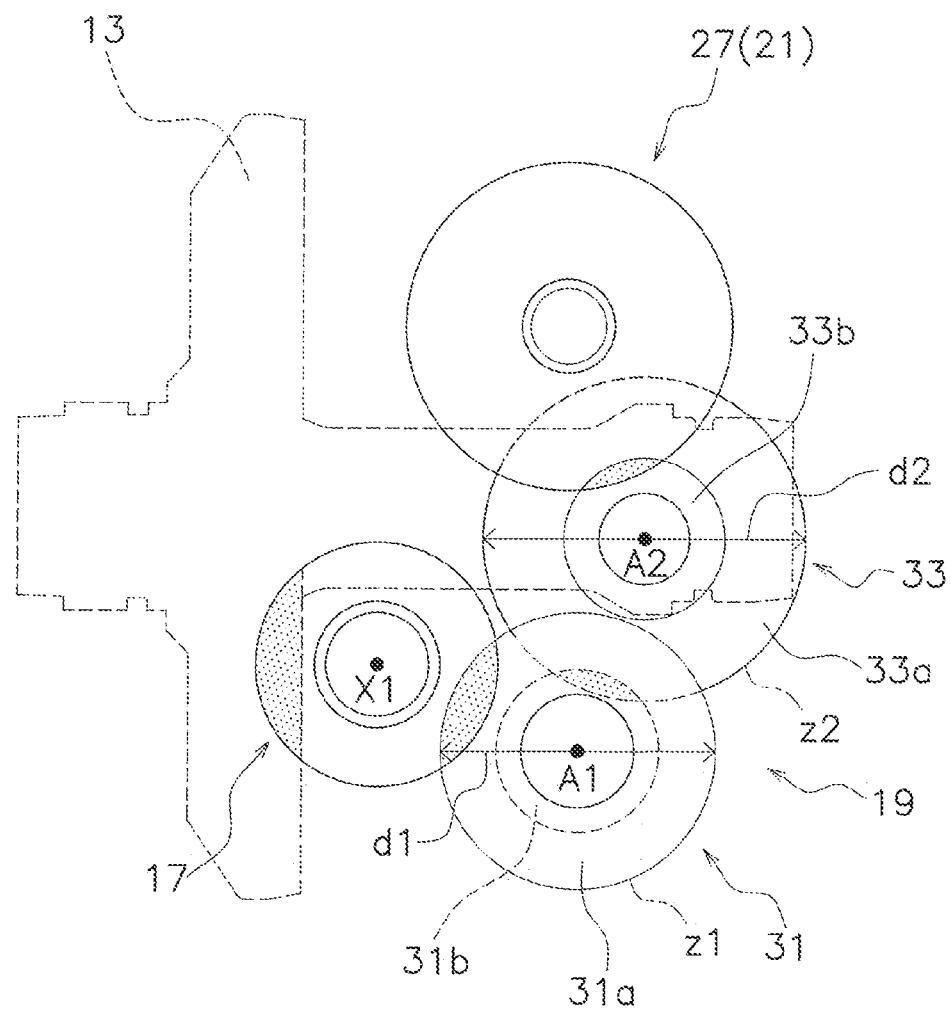
FIG. 5 is a side view for explaining the reduction mechanism.

As shown in FIG. 5, the reduction mechanism 19 reduces the rotation of the pinion gear 17 and transmits it to the oscillating mechanism 21. In FIG. 5, the gear teeth of each gear have been omitted. Hatching has been applied to the portions where the gears mesh with each other.

The reduction mechanism 19 is disposed between the pinion gear 17 and the oscillating mechanism 21. For example, the reduction mechanism 19 is disposed between the pinion gear 17 and the worm shaft gear 27.

The reduction mechanism 19 has a first intermediate gear 31 and a second intermediate gear 33. The first intermediate gear 31 is rotatable about a first axis A1 parallel to the spool axis X1. The first intermediate gear 31 is supported by the reel body 3 so as to be rotatable. The first intermediate gear 31 has a first module M1. The first module M1 is calculated by dividing the diameter d1 of the pitch circle of the first intermediate gear 31 by the number of teeth z1 of the first intermediate gear 31. This formula is expressed as "M1=d1/z1." In FIG. 5, the leader line indicating the number of teeth z1 of the first intermediate gear 31 is indicated by the double-dash broken line.

The first intermediate gear 31 has a first large-diameter gear 31a and a first small-diameter gear 31b. The first large-diameter gear 31a meshes with the pinion gear 17. The axis of rotation of the first large-diameter gear 31a is the first axis A1. The first small-diameter gear 31b has a smaller diameter than the first large-diameter gear 31a. The first small-diameter gear 31b is integrally formed with the first large-diameter gear 31a and integrally rotates with the first large-diameter gear 31a. The axis of rotation of the first small-diameter gear 31b is the first axis A1.

The second intermediate gear 33 is rotatable about a second axis A2 parallel to the first axis A1. The second intermediate gear 33 is supported by the reel body 3 so as to be rotatable. The second intermediate gear 33 has a second module M2. The second module M2 is calculated by dividing the diameter d2 of the pitch circle of the second intermediate gear 33 by number of teeth z2 of the second intermediate gear 33. This calculation formula is expressed as "M2=d2/z2." In FIG. 5, the lead line indicating the number of teeth z2 of the second intermediate gear 33 is indicated by the double-dash broken line.

The second intermediate gear 33 has a second large-diameter gear 33a and a second small-diameter gear 33b. The second large-diameter gear 33a meshes with the first small-diameter gear 31b. The axis of rotation of the second large-diameter gear 33a is the second axis A2. The second small-diameter gear 33b has a smaller diameter than the second large-diameter gear 33a. The second small-diameter gear 33b is integrally formed with the second large-diameter gear 33a and integrally rotates with the second large-diameter gear 33a. The axis of rotation of the second small-diameter gear 33b is the second axis A2. The second small-diameter gear 33b meshes with the worm shaft gear 27.

When the handle shaft 11 is rotated by the rotary operation of the handle 5, the drive gear 13 is rotated. The rotation of the drive gear 13 is transmitted to the pinion gear 17 and the rotation of the pinion gear 17 is transmitted to the worm shaft gear 27 via the reduction mechanism 19 described above. The rotation of the worm shaft gear 27 is transmitted to the worm shaft 23, and the rotation of the worm shaft 23 moves the slider 25 and the spool shaft 15 in the front-rear direction.

As shown in FIGS. 1 and 2, the rotor 9 is used to wind a fishing line about the spool 7. The rotor 9 is disposed on a front portion of the reel body 3, and is configured so as to be rotatable with respect to the reel body 3. The rotor 9 is disposed on the radially outward side of the pinion gear 17, and is mounted so as to be integrally rotatable with respect to the pinion gear 17.

When the handle shaft 11 is rotated by the rotary operation of the handle 5, the drive gear 13 rotates. The rotation of the drive gear 13 is transmitted to the pinion gear 17. The rotor 9 rotates in conjunction with the rotation of the pinion gear 17.

Figure 6:
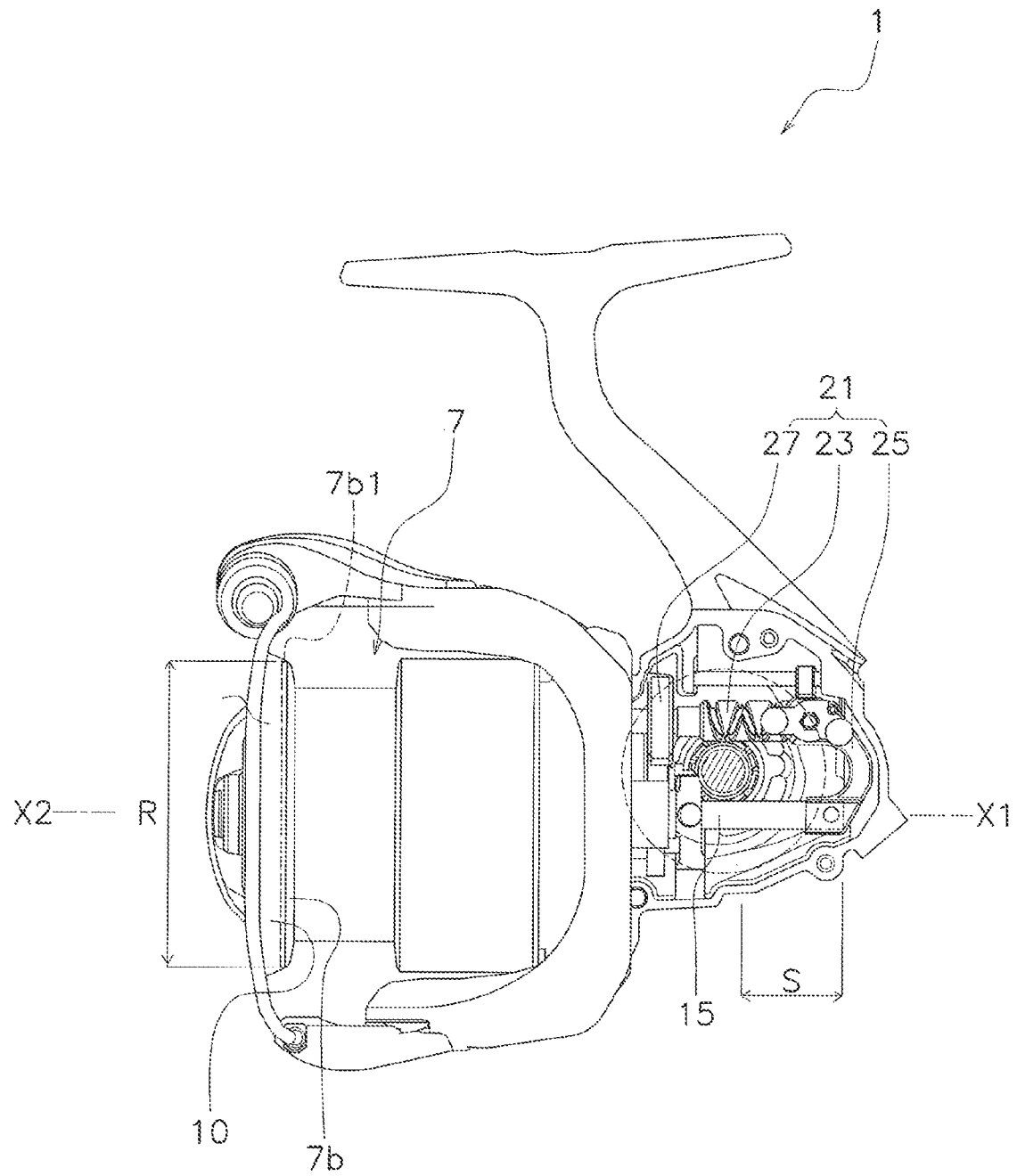
FIG. 6 is a side view for explaining a configuration used for increasing the winding amount of the fishing line.

The spinning reel 1, which has the configuration described above, is configured as follows. The outer diameter R of the front flange 7b shown in FIGS. 3 and 6 is less than 60 mm. For example, preferably, the outer diameter R of the front flange 7b is greater than or equal to 35 mm and less than 60 mm. More preferably, the outer diameter R of the front flange 7b is greater than or equal to 40 mm and less than 56 mm. The outer diameter R of the front flange 7b is defined by the outer circumferential surface 7b1 of the front flange 7b.

Winding pitch P of the fishing line is less than or equal to 1.0 mm. For example, preferably, the fishing line winding pitch P is greater than or equal to 0.4 mm and less than or equal to 1.0 mm. More preferably, the fishing line winding pitch P can be greater than or equal to 0.55 mm and less than or equal to 0.90 mm. The winding pitch P of the fishing line is the axial distance between adjacent fishing lines on the bobbin trunk 7a.

The fishing line winding pitch P is not constant but depends on the structure of the oscillating mechanism 21. Thus, here, the average line winding pitch is used as the line winding pitch P. The average line winding pitch is obtained by dividing a round-trip stroke distance (S x 2) by the number of rotations of the rotor 9 during one round-trip reciprocation of the spool shaft 15.

The first value (S/(P·M)) obtained by dividing the stroke distance S of the spool shaft 15 by one of smaller module M of the first module M1 of the first intermediate gear 31 and the second module M2 of the second intermediate gear 33 is greater than or equal to 60. The first value (S/(P·M))

obtained by dividing the stroke distance S of the spool shaft 15 by the smaller module M of the first module M1 of the first intermediate gear 31 and the second module M2 of the second intermediate gear 33 is less than or equal to 150. These relationships are expressed by the relational expression "60≤S/(P·M))≤150".

As shown in FIG. 6, the stroke distance S of the spool shaft 15 is the amount that the spool shaft 15 is moved in the front-rear direction by the oscillating mechanism 21. Preferably, the stroke distance S of the spool shaft 15 is greater than or equal to 12 mm and less than or equal to 25 mm. More preferably, the stroke distance S of the spool shaft 15 is greater than or equal to 13 mm and less than or equal to 23 mm.

FIG. 7 shows, in tabular form, each of the above-described numerical values as well as comprehensive ratings for casting and reeling a spinning reel 1 to which the embodiments of present invention have been applied (adopted models 1 and 2), a spinning reel 1 that can employ embodiments of the present invention by changing specifications of the adopted models 1 and 2 (comparative model 3), and conventional spinning reels having an intermediate gear or a gear corresponding to an intermediate gear (conventional models 1-3).

The "comprehensive ratings for casting and reeling" in FIG. 7 shows the results from a plurality of tests performed to assess casting and reeling (fishing line winding) for each of "size categories A, B, C" of each spinning reel based on sensory evaluations and rankings by a paired comparison test method with respect to quietness, stretching sensation, winding stability, and the like. In the code for the "comprehensive ratings for casting and reeling," the letters represents the size category and the numerical value represents the ranking.

For example, under size category A, the comprehensive rating A1 of adopted model 1 has the highest rating, as compared with the comprehensive rating A2 of conventional model 1. Under size category B, the comprehensive rating B1 of adopted model 2 has the highest rating, as compared with the comprehensive rating B2 of conventional model 2. Under size category C, the comprehensive rating C1 of comparative model 3 has the highest rating, as compared with the comprehensive rating C2 of conventional model 3. In this manner, the comprehensive ratings A1, B1, and C1 of the adopted models 1, 2, and comparative model 3, respectively have obtained higher ratings in each of the size categories A, B, C, as compared with the comprehensive ratings A2, B2, and C2 of the conventional models, respectively.

The spinning reel 1 described above has the following features. The spinning reel 1 is configured such that the first value (S/(P·M)) obtained by dividing the stroke distance S of the spool shaft 15 by the fishing line winding pitch P and the module M of the intermediate gears 31, 33 is greater than or equal to 60. By designing the oscillating mechanism 21 and the spool 7 using this configuration, the problems of the conventional spinning reels can be suitably solved.

In the spinning reel 1, the first value (S/(P·M)) obtained by dividing the stroke distance S of the spool shaft 15 by the fishing line winding pitch P and the module M of the intermediate gears 31, 33 is less than or equal to 150. In the spinning reel 1, the fishing line winding pitch P is less than or equal to 1.0 mm. In the spinning reel 1, the outer diameter R of the front flange 7b is less than 60 mm. Since the spinning reel 1 has the first intermediate gear 31 and the second intermediate gear 33, the fishing line can be wound about the bobbin trunk 7a as the speed of movement of the spool shaft 15 in the front-rear direction is reduced. As a result, the problems of the conventional spinning reels can be suitably solved with a relatively simple structure.

Embodiments of the present invention can be used in a spinning reel.

What is claimed is:
1. A spinning reel, comprising:
a reel body;
a spool shaft moveably supported to the reel body in a front-rear direction with a reciprocal stroke distance (S);
a spool connected to the spool shaft and configured to have a fishing line wound therearound;
a pinion gear rotatably supported by the reel body;
a reciprocating mechanism configured to move the spool shaft in the front-rear direction reciprocally; and
an intermediate gear disposed between the pinion gear and the reciprocating mechanism, the intermediate gear configured to transmit a rotation from the pinion gear to the reciprocation mechanism with deceleration;
a first value (S/(P·M)) obtained by dividing the stroke distance (S) by a winding pitch (P) and a module (M) of the intermediate gear being greater than or equal to 60,
the winding pitch (P) obtained by dividing a round trip stroke (S x 2) by a number of rotations of a rotor during one round trip of the spool shaft, and
the module (M) obtained by dividing a diameter of a pitch circle of the intermediate gear by a number of teeth of the intermediate gear.
2. The spinning reel according to claim 1, wherein the first value (S/(P·M)) is less than or equal to 150.
3. The spinning reel according to claim 1, wherein the winding pitch is less than or equal to 1.0 mm.
4. The spinning reel according to claim 1, wherein
the spool has a bobbin trunk capable of have a fishing line wound therearound, and a front flange extending radially outwardly from a front end of the bobbin trunk, and
an outer diameter of the front flange is less than 60 mm.
5. The spinning reel according to claim 1, wherein
the intermediate gear has a first intermediate gear with a first module and a second intermediate gear with a second module,
the first intermediate gear configured to rotate about a first axis parallel to the spool shaft, the first intermediate gear having a first large-diameter gear configured to mesh with the pinion gear and a first small-diameter gear having a smaller diameter than the first large-diameter gear and configured to integrally rotate with the first large-diameter gear, and,
a second intermediate gear configured to rotate about a second axis parallel to the first axis, the second intermediate gear having a second large-diameter gear configured to mesh with the first small-diameter gear and a second small-diameter gear having a smaller diameter than the second large-diameter gear and configured to integrally rotate with the second large-diameter gear,
the first value (S/(P·M)) obtained by dividing the stroke distance (S) by a winding pitch (P) and one of smaller module (M) of the first module (M1) and second module (M2) is greater than or equal to 60.

* * * * *